United States Patent [19]

Yu

[11] Patent Number: 5,308,140
[45] Date of Patent: May 3, 1994

[54] SHOCK-ABSORBING DEVICE FOR A BICYCLE SEAT

[76] Inventor: Stella Yu, No. 1012, Sec. 1, Chung-Shan Rd., Ta-Chia Chen, Taichung Hsien, Taiwan

[21] Appl. No.: 25,878

[22] Filed: Mar. 3, 1993

[51] Int. Cl.[5] .............................................. B62J 1/02
[52] U.S. Cl. .................... 297/195.1; 267/242
[58] Field of Search ............... 297/215, 215.1, 204, 297/205, 195.1, 215.15, 215.14, 215.13, 207; 267/234, 242, 41, 158, 164, 131

[56] References Cited

U.S. PATENT DOCUMENTS

| | | | |
|---|---|---|---|
| 467,402 | 1/1892 | Garford | 297/205 X |
| 549,466 | 11/1895 | Seaman | 297/205 |
| 1,518,157 | 12/1924 | Linder | 297/207 |

FOREIGN PATENT DOCUMENTS 2272884  12/1975  France .................. 297/195.1

*Primary Examiner*—Kenneth J. Dorner
*Assistant Examiner*—Milton Nelson, Jr.
*Attorney, Agent, or Firm*—Wells, St. John, Roberts, Gregory & Matkin

[57] ABSTRACT

A shock-absorbing device includes a saddle support which is to be mounted to a bottom side of a saddle of a bicycle seat. The saddle support is made of metal and has a substantially U-shaped horizontal portion with left and right arms. Each of the left and right arms has a distal upwardly curving end. The saddle support further has a pair of extensions which extend respectively from the upwardly curving end of the left and right arms. The extensions are disposed above and are parallel to a respective one of the left and right arms. Each of the extensions has a distal outwardly bent hook end. The shock-absorbing device further includes an adjustment unit with a pair of cylindrical portions, which are clamped tightly between a respective one of the left and right arms and a respective one of the extensions, and a retaining unit which extends across the left and right arms so as to retain the adjustment unit on the saddle support.

3 Claims, 5 Drawing Sheets

SHOCK-ABSORBING DEVICE FOR A BICYCLE SEAT

BACKGROUND OF THE INVENTION

1. Field of the Invention

The invention relates to a shock-absorbing device for a bicycle seat, more particularly to a shock-absorbing device in which the damping force offered thereby can be adjusted so as to suit the user's requirements.

2. Description of the Related Art

A conventional bicycle seat basically comprises a saddle and a shock-absorbing device. There are two types of shock-absorbing devices which are commonly installed. Referring to FIG. 1, the first type of shock-absorbing device comprises a saddle support (12), which has a front end secured to a bottom side of the saddle (10), and a compression spring (11) which has a lower end secured on the rear end of the saddle support (12) and an upper end secured to the bottom side of the saddle (10). The compression spring (11) serves to damp the vibrations felt when the bicycle is in use.

Referring to FIG. 2, the second type of shock-absorbing device comprises a saddle support (21) secured to the bottom side of the saddle (20). The saddle support (21) has resilient properties, thereby enabling the same to damp the vibrations felt when the bicycle is in use.

Note that in the above-mentioned shock absorbing devices, the damping force offered by the compression spring (11) or by the saddle support (21) cannot be adjusted in order to suit the user's requirements. For example, if the user is relatively light, the force applied on the shock-absorbing device is relatively small. The shock-absorbing device moves within a relatively large range, thereby resulting in a very pronounced movement of the saddle. If the user is relatively heavy, the force applied on the shock-absorbing device is relatively large and may cause deformation of the shock-absorbing device. The shock-absorbing device moves within a very small range, and thus, the shock-absorbing device cannot damp effectively the vibrations felt when the bicycle is in use.

SUMMARY OF THE INVENTION

Therefore, the objective of the present invention is to provide a shock-absorbing device for a bicycle seat in which the damping force offered thereby can be adjusted so as to suit the user's requirements.

Accordingly, the preferred embodiment of a shock-absorbing device of the present invention comprises: a saddle support to be mounted to a bottom side of a saddle of a bicycle seat, said saddle support being made of metal and having a substantially U-shaped horizontal portion with left and right arms, each of the left and right arms having a distal upwardly curving end, said saddle support further having a pair of extensions which extend respectively from the upwardly curving end of the left and right arms, said extensions being disposed above and being parallel to a respective one of the left and right arms, each of the extensions having a distal outwardly bent hook end; and an adjustment unit with a pair of cylindrical portions, which are clamped tightly between a respective one of the left and right arms and a respective one of the extensions, and a retaining unit which extends across the left and right arms so as to retain the adjustment unit on the saddle support.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
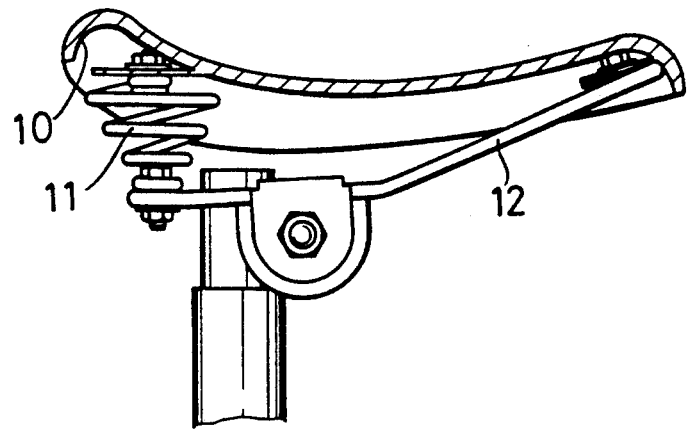
FIG. 1 illustrates a first example of a conventional bicycle seat.
Figure 2:
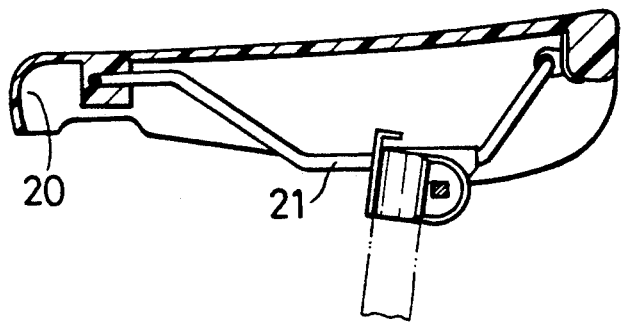
FIG. 2 illustrates a second example of a conventional bicycle seat.
Figure 3:
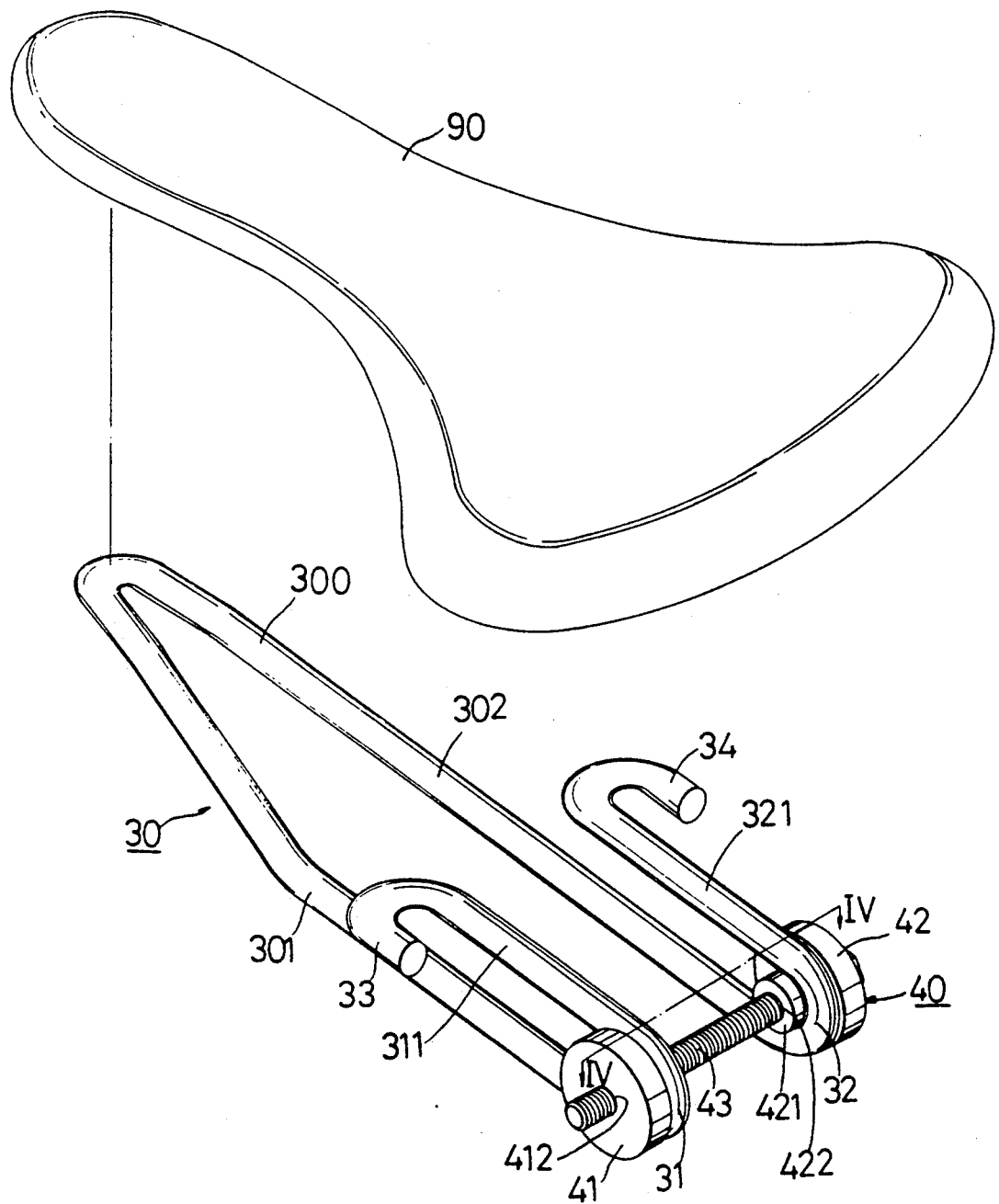
FIG. 3 is a perspective view of the first preferred embodiment of a shock-absorbing device according to the present invention, said shock-absorbing device being detached from a saddle.
Figure 4:
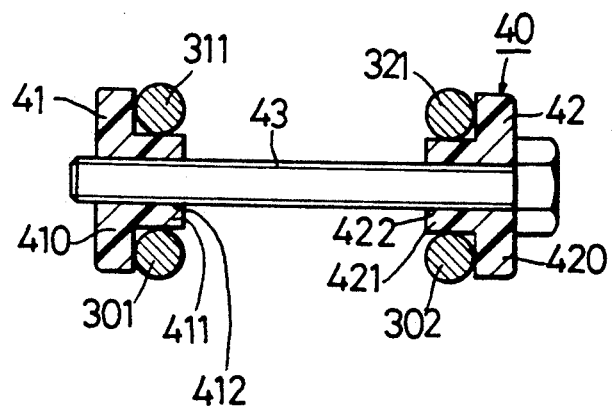
FIG. 4 is a IV—IV section of FIG. 3.

Referring to FIGS. 3 and 4, the first preferred embodiment of a shock-absorbing device according to the present invention is to be mounted to the bottom side of a conventional saddle (90) and comprises a saddle support (30) and an adjustment unit (40).

The saddle support (30) is secured to the bottom side of the saddle (90) and is made of metal. The saddle support (30) has a substantially U-shaped horizontal portion (300) with left and right arms (301, 302). Each of the left and right arms (301, 302) has a distal upwardly curving end (31, 32). The saddle support (30) further has extensions (311, 321) which extend respectively from the upwardly curving ends (31, 32) of the left and right arms (301, 302) and which are disposed above and are parallel to the respective one of the left and right arms (301, 302). Each of the extensions (311, 321) has a distal outwardly bent hook end (33, 34). The hook ends (33, 34) abut against the bottom side of the saddle (90) when the saddle support (30) is mounted to the latter.

The adjustment unit (40) includes a pair of rollers (41, 42) and a retaining unit (43).

Each of the rollers (41, 42) has a circular plate portion (410, 420) which is disposed on an outer side of a respective one of the left and right arms (301, 302) and a cylindrical portion (411, 421) which projects axially from one side of the circular plate portion (410, 420) and which is clamped tightly between one of the left and right arms (301, 302) and one of the extensions (311, 321). Each of the rollers (41, 42) is further formed with a threaded axial hole (412, 422).

The retaining unit (43) is a bolt which is preferably longer than the distance between the extensions (311, 321). The retaining unit (43) extends threadedly into the axial holes (412, 422), thus retaining the rollers (41, 42) on the saddle support (30).

Figure 5:
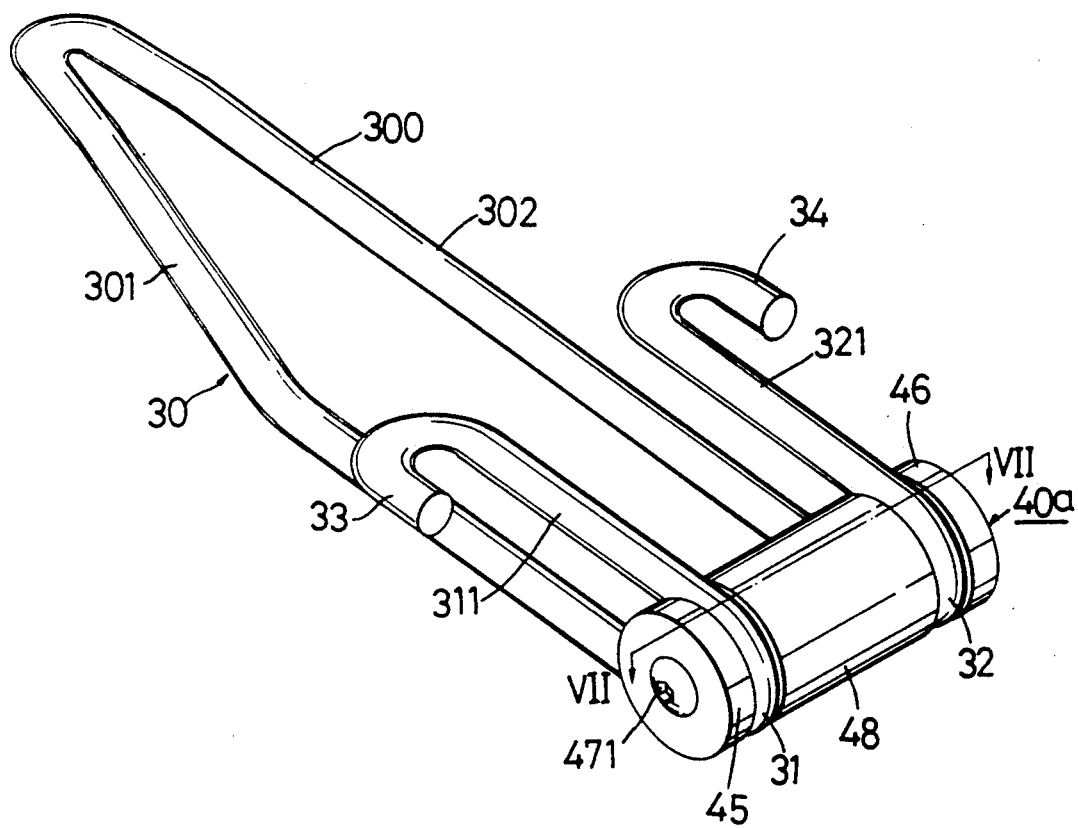
FIG. 5 is a perspective view of the second preferred embodiment of a shock-absorbing device according to the invention.
Figure 6:
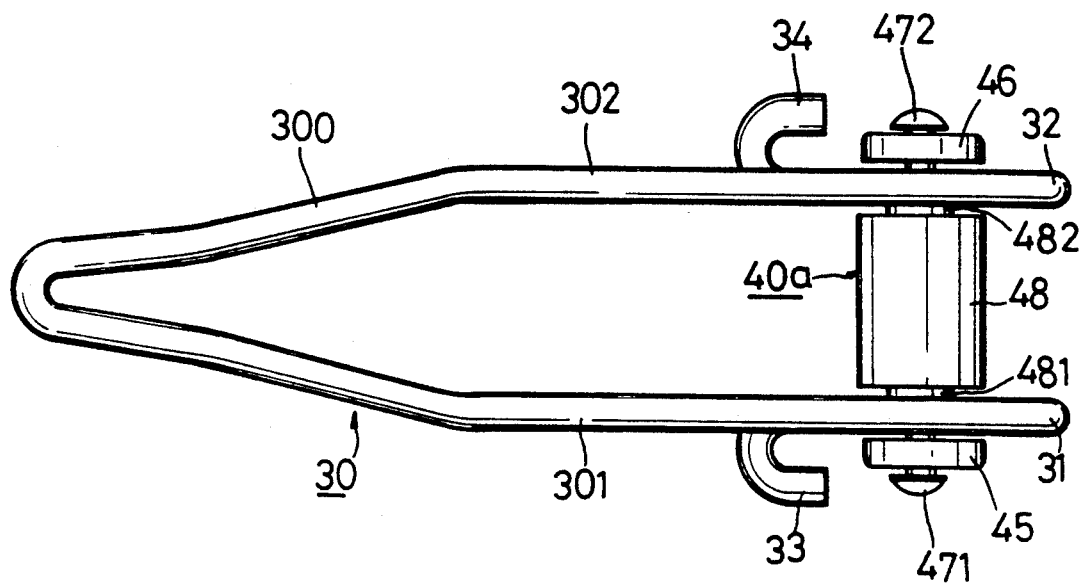
FIG. 6 is a bottom view of the second preferred embodiment.
Figure 7:
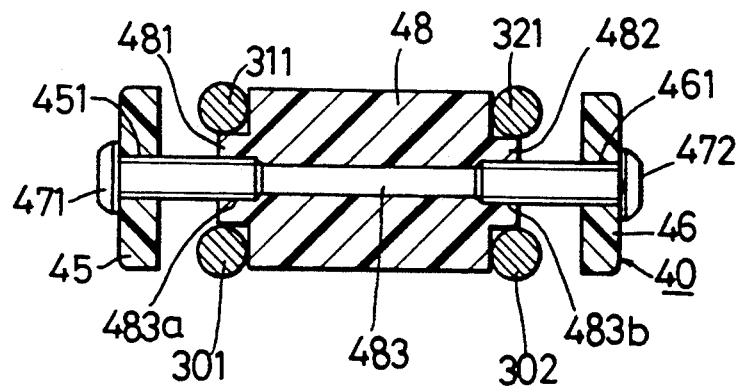
FIG. 7 is a VII—VII section of FIG. 5.

Referring to FIGS. 5 to 7, the second preferred embodiment of a shock-absorbing device according to the present invention is shown to be substantially similar to the first preferred embodiment. The second preferred embodiment also comprises a saddle support (30) and an adjustment unit (40a).

The adjustment unit (40a) includes a pair of circular plates (45, 46), a retaining unit (47) and a cylindrical member (48).

The cylindrical member (48) is disposed between the left and right arms (301, 302) of the saddle support (30) and has a cross-sectional diameter which is larger than the distance between the left and right arms (301, and a respective one of the extensions (311, 321). The cylindrical member (48) has two sides from which a respective cylindrical portion (481, 482) axially projects. The cylindrical portions (481, 482) are clamped tightly between a respective one of the left and right arms (301, 302) and a respective one of the extensions (311, 321). The cylindrical member (48) is further formed with an axial hole (483) which is threaded at two ends (483a, 483b).

Each of the circular plates (45, 46) is made from injected plastic and has an appropriate thickness. The circular plates (45, 46) are respectively disposed on an outer side of the left and right arms (301, 302). Each of the circular plates (45, 46) is further formed with a central hole (451, 461) which is aligned with the axial hole (483) of the cylindrical member (48). The retaining unit (47) includes a pair of bolts (471, 472), each of which extends through the hole (451, 461) of a respective one of the circular plates (45, 46) and engages one of the threaded ends (483a, 483b) of the axial hole (483) of the cylindrical member (48), thereby mounting the circular plates (45, 46) on the cylindrical member (48) so as to retain the adjustment unit (40a) on the saddle support (30).

Figure 8:
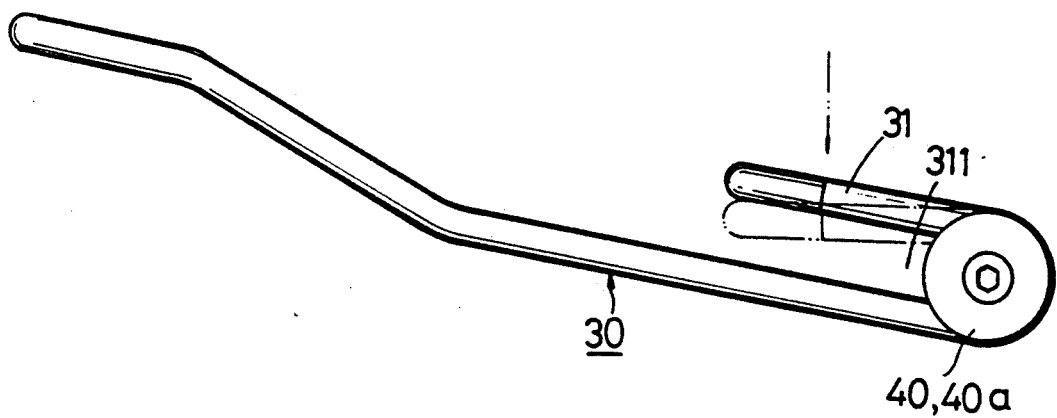
FIG. 8 illustrates the shock-absorbing device of the present invention when in the most resilient state of use.

Referring to FIG. 8, to adjust the shock-absorbing device to the most resilient state of use, the retaining unit is operated so as to permit movement of the adjustment unit (40, 40a) toward the upwardly curving ends (31, 32) of the left and right arms (301, 302). The adjustment unit (40, 40a) permits movement of the hook ends (33, 34) within a relatively large range at this stage, which movement is due to the weight of the user when the bicycle is in use. Alternatively, the adjustment unit (40, 40a) may be removed from the saddle support (30) to achieve the same effect.

Figure 9:
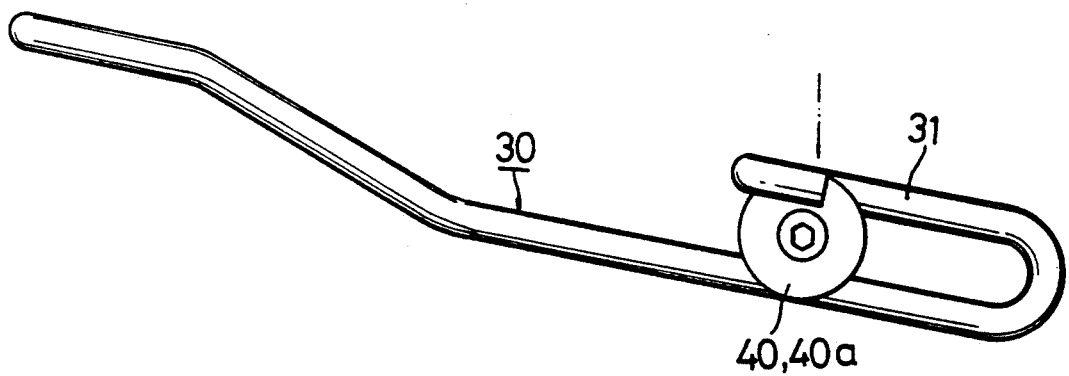
FIG. 9 illustrates the shock-absorbing device of the present invention when in the least resilient state of use.

If the user feels that movement of the saddle (not shown) is very pronounced, the shock-absorbing device may be adjusted to a less resilient state of use. Referring to FIG. 9, to adjust the shock-absorbing device to the least resilient state of use, the retaining unit is operated so as to permit movement of the adjustment unit (40, 40a) toward the hook ends (33, 34). The adjustment unit (40, 40a) limits movement of the hook ends (33, 34) within a very small range at this stage, thereby effectively restricting movement of the saddle.

It has thus been shown that the shock-absorbing device of the present invention permits adjustments in the damping force offered thereby so as to suit the user's requirements. Therefore, a bicycle seat which incorporates the shock-absorbing device of the present invention is more comfortable to use than those which incorporate a conventional shock-absorbing device.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A shock-absorbing device for a bicycle seat with a saddle, said shock-absorbing device including a saddle support to be mounted to a bottom side of the saddle, wherein the improvement comprises:

said saddle support being made of metal and having a substantially U-shaped horizontal portion with left and right arms, each of said left and right arms having a distal upwardly curving end, said saddle support further having a pair of extensions which extend respectively from said upwardly curving end of said left and right arms, said extensions being disposed above and being parallel to a respective one of said left and right arms, each of said extensions having a distal outwardly bent hook end; and said shock-absorbing device further including an adjustment unit with a pair of cylindrical portions, which are clamped tightly between a respective one of said left and right arms and a respective one of said extensions, and a retaining unit which extends across said left and right arms so as to retain said adjustment unit on said saddle support.

2. The shock-absorbing device as claimed in claim 1, wherein:

said adjustment unit further comprises a pair of rollers, each of which having a circular plate portion disposed on an outer side of a respective one of said left and right arms, each of said cylindrical portions projecting axially from one side of a respective one of said circular plate portions, each of said rollers further having a threaded axial hole; and said retaining unit is a bolt which extends threadedly into said axial holes of said rollers.

3. The shock-absorbing device as claimed in claim 1, wherein:

said adjustment unit further comprises: a cylindrical member disposed between said left and right arms of said saddle support, each of said cylindrical portions projecting axially from a respective side of said cylindrical member, said cylindrical member being formed with an axial hole which is threaded at two ends; and a pair of circular plates, each of which being disposed on an outer side of a respective one of said left and right arms, each of said circular plates being formed with a central hole which is aligned with said axial hole of said cylindrical member; and said retaining unit includes a pair of bolts, each of which extends through said hole of a respective one of said circular plates and engages one of said threaded ends of said axial hole of said cylindrical member.

* * * * *